No Printed Specification Available
8347X
T. Blanchard.
Circular Saw Mill.
Patented Aug. 8, 1834.
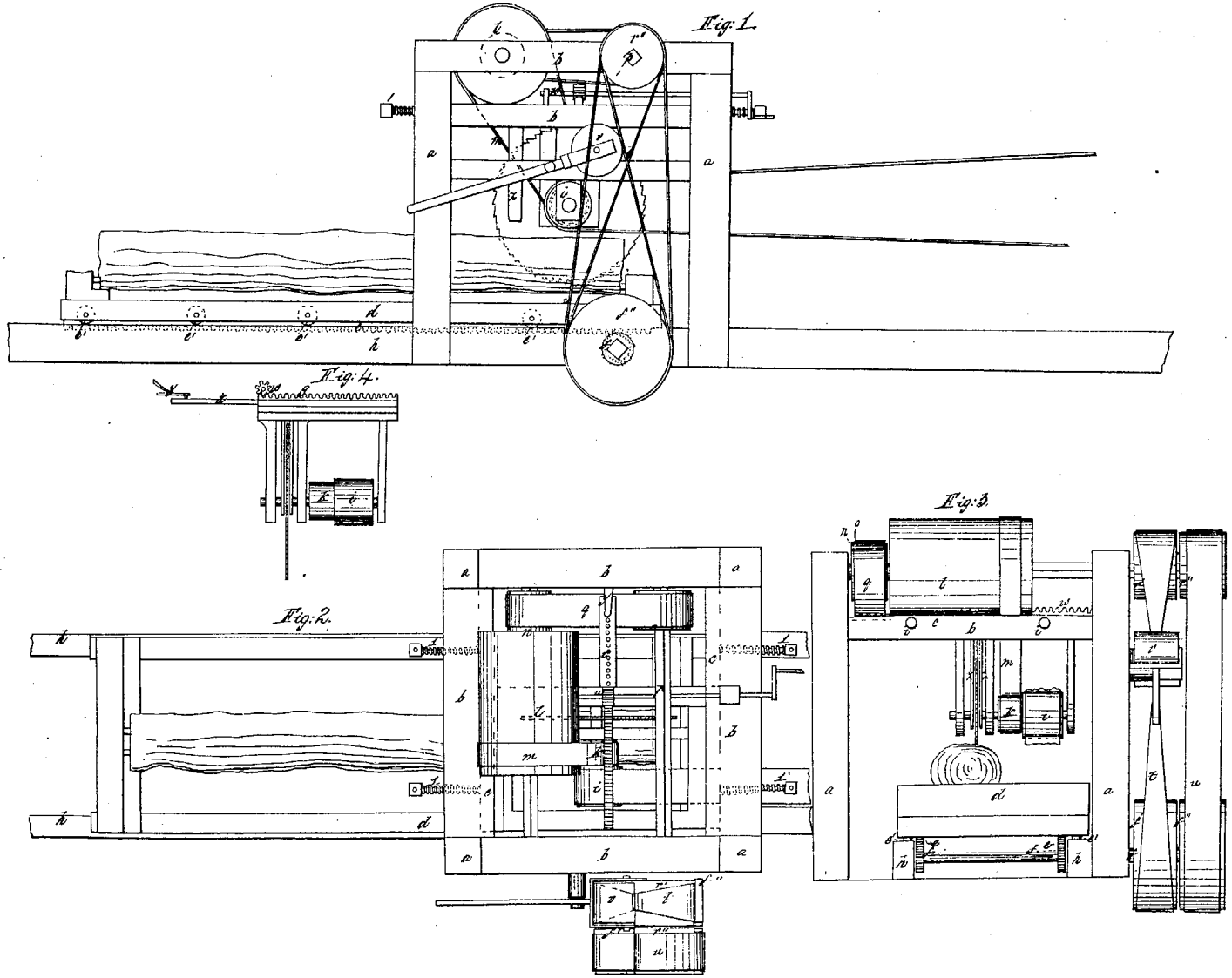
AM. PHOTO-LITHO. CO. N.Y. (OSBORNE'S PROCESS)

Aug. 8. 1834 85.
8347X

Thomas Blanchard, of the City of New York.

Letters Patent.

The schedule referred to in these Letters Patent and making part of the same containing a description in the words of the said Thomas Blanchard himself of his improvement in the saw mill, which he call Blanchards shifting circular saw mill To all to whom these presents shall come Be it known that I Thomas Blanchard of the City of New york in the county and State of New York, have invented a new and useful improvement in the saw Mill for sawing lumber, which I call Blanchards Shifting circular Saw Mill, of which the following is a full and exact description viz.

A wooden frame may be made consisting of four parts eight feet high, six feet apart connected together with proper girders & beams at top and bottom, Inside of this frame at the bottom, are ways in which a carriage runs of sufficient length for the lumber to be sawed, on the under side of said carriage is a rack with the cogs or teeth downwards, into this rack, a pinion wheel plays, which gives the carriage a sliding horizontal Motion like an ordinary saw mill carriage, Above the log carriage at a proper distance is a saw carriage which may be made of iron, and sufficient width and length to contain the saw and saw arbor, This carriage is made to move freely in grooves made in ways made fast to the four parts of said frame, the motion of the saw carriage must be at right angles with the log carriage and is moved at every cut of the saw, to give the board to be sawed its proper thickness, On one end of the saw arbor is a pulley which gives motion to the saw. by the side of which is a small pulley which conveys a descending motion to the log carriage by belts. A belt passing around it and thence round a large pulley or drum on a shaft on the top of said frame, On the other end of said shaft is a small pulley which gives motion to a second shaft on top of said frame on which is a larger pulley, On the end of said second shaft, on the top of the frame is a double pulley direct-ly over a double pulley of large size on the pinion shaft which is under the log carriage These pulleys are driven by two belts the one crossed the other running upon a tightened pulley is made to bear against the cross belt while the log carriage is moved towards the saw in the ope-ration of sawing and to reverse the motion and bring the carriage back, the tightening pulley is borne against the other, belt which causes the cross belt to slide over the pulley and gives the pinion shaft a reversed motion, The saw carriage may be moved occasionally by a hand crank and geared work or otherwise; the distance of moving the saw carriage to give the proper thickness to the board to be cut is fixed by an index plate in which holes are made of the proper distance apart for the thickness of the board to be sawed; This plate is connected at one end to the saw carriage, at the other end to a stationary pin which will enter into the holes of the index plate, and as often as the saw cuts a board from the log the index plate is moved so that the said stationary pin may enter the next proper hole; and thus the boards will all be of equal thickness, Guides may be placed at each side of the saw, made fast to the saw carriage, and as near the saw as possible, without producing friction, which will pre-vent the saw from having a tremulous motion, There must be set screws to adjust the saw carriage, so as to give the saw a straight forward direction, as it passes through the ope-ration of cutting, and thus vary the inclination of the saw as it inclines to or from the log, This applicant in further compliance with the Law describes the character
or principle which constitutes his invention or improvement
distinguishing it from others of the same kind known and used
before, The principle of this invention consists of the com
bination of a circular saw upon a shifting carriage, with a
common saw mill log carriage of any convenient construction the
said shifting carriage being made to slide at right angles with
the log carriage, the thickness of the board, plank, or other lumber
to be cut, and to be firmly fixed in its position always during
the action of the machine substantially as the same is above des
-cribed, Circular saws are not claimed by this applicant, nor
the construction of circular saws upon shifting or sliding car-
riages, nor does he claim a patent for the particular con-
struction of the said shifting carriage: nor the index whereby
the extent of its lateral motion may be adjusted and fixed
But the invention which he claims as his, consists, as
aforesaid, of the combination of a circular saw on a
shifting carriage, constructed substantially as aforesaid
in any convenient form, and capable by any convenient
means of being shifted and fixed as aforesaid in operation
with a log carriage of any convenient construction differing
from the common and known saw mill in this, especially, that
the saw in these is not made to shift but the log is shifted
in its carriage according to the thickness of the lumber to be
sawed Witnesses Thomas Blanchard Henry Rogers Junr.
Saml. N. Richards Exd. W.J.C.